United States Patent [19]

Bryan

[11] Patent Number: 5,282,233
[45] Date of Patent: Jan. 25, 1994

[54] LOW PRESSURE DROP EASY LOAD END CAP

[75] Inventor: William J. Bryan, Granby, Conn.

[73] Assignee: Combustion Engineering, Inc., Windsor, Conn.

[21] Appl. No.: 952,106

[22] Filed: Sep. 28, 1992

[51] Int. Cl.⁵ .............................................. G21C 3/10
[52] U.S. Cl. .................................... 376/451; 376/457; 376/453
[58] Field of Search ............... 376/451, 264, 409, 453, 376/261, 438, 457, 446, 434; 976/DIG. 48, DIG. 65

[56] References Cited

U.S. PATENT DOCUMENTS

| | | | |
|---|---|---|---|
| 4,391,771 | 7/1983 | Anthony | 376/451 |
| 4,640,407 | 2/1987 | Widener et al. | 198/389 |
| 4,798,699 | 1/1989 | Cerni et al. | 376/327 |
| 4,820,058 | 4/1989 | Wilson et al. | 376/327 |
| 5,174,948 | 12/1992 | Bryan et al. | 376/264 |

Primary Examiner—Donald P. Walsh
Assistant Examiner—Meena Chelliah
Attorney, Agent, or Firm—John H. Mulholland

[57] ABSTRACT

A low pressure drop easy load fuel assembly rod end cap 40 for pressurized water reactor fuel assembly rods 10 has a solid Zircaloy radiused tip 42. The tip 42 blends into a longitudinal profile defined by a smooth convex curve 44,46 which blends into a substantially cylindrical surface portion 48 of a diameter substantially equal to the diameter of the fuel cladding tube or other shank 50.

4 Claims, 3 Drawing Sheets

LOW PRESSURE DROP EASY LOAD END CAP

FIELD OF THE INVENTION

The invention described herein relates to end caps for rods of nuclear reactor fuel assemblies. More particularly, this invention relates to a low pressure drop easy load end cap for fuel assembly rods, including fuel rods, "poison" rods and "dummy" or reflector rods which are designed to be loaded into square spaces or cells of support grids of Pressurized Water Reactor (PWR) fuel assemblies.

BACKGROUND OF THE INVENTION

Commercial nuclear reactors used for generating electric power include a core composed of a plurality of fuel assemblies which generate heat used for electric power generation purposes. Each fuel assembly includes an array of fuel assembly rods and control rod guide tubes held in spaced relationship with each other by grids of egg-crate configuration spaced along the fuel assembly length. The fuel assembly rods may be approximately 0.5 inches in diameter and about 12 feet long, thus requiring a number of support grids along their length. Each grid includes a plurality of orthogonal Inconel or Zircaloy straps which are assembled in known manner to form multiple cells, with each cell having springs on two adjacent walls and projections, such as grid "waves" or arches (see U.S. Pat. No. 4,295,935), on each of the other two adjacent opposing walls. The springs impose lateral forces on each rod in the assembly, pressing the rods into contact with the opposing arches. One disadvantage inherent in this design, however, is that the inwardly projecting springs and arches, sometimes called "support features", as well as the cell defining grid strips, themselves, may cause fuel assembly rods being assembled into the fuel assembly by pushing or pulling to "hang-up" and damage the grid or to buckle a fuel rod's hollow fuel containing tubular cladding behind the solid end cap.

SUMMARY OF THE INVENTION

The invention, in one aspect, relates to the elimination or minimization of grid damage during insertion or "loading" of the fuel assembly rods into the PWR fuel assembly "skeleton" formed by an upper end fitting, a lower end fitting and guide tubes therebetween having spaced rod support spacer grids fixed to the guide tubes by welds or mechanical bulges. In another aspect, the invention relates to the maintenance of a low pressure drop as coolant moves through the lower end fitting and upwards along the rods of the fuel assembly.

More particularly, the invention provides a fuel assembly rod end cap constructed from solid Zircaloy, or the like, according to the principles of the invention, for use with PWR's having fuel assemblies with two end fittings connected by guide tubes with a plurality of rod and guide tube cell defining spacer grids. Each rod cell is formed by generally orthogonal strips, and unless occupied by a guide tube, has rod support features and, in some designs, reactor coolant mixing vanes. The novel end cap of the invention has a solid radiused tip with a longitudinal profile defined by a smooth convex curve which blends into a substantially cylindrical surface portion of a diameter substantially equal to the diameter of the rod, as determined by the diameter of the fuel cladding tube or other rod shank to which the end cap is attached. The radiused tip is located on the end cap opposite to the clad or shank portion of the rod. The rod is inserted progressively through the several grids and, because of the novel end cap shape, centers itself in its cells by a camming action against the strips and, or, support features with a minimum of grid damage. This also lessens the chance that, if vanes are present, they will be damaged.

The novel Zircaloy end cap of the invention also provides thermo-hydraulic advantages due to the low pressure drop its convex smooth and blended curved profile and radiused tip provide. Its curved and radiused profile also helps "leading-in" the rods from grid to grid in that it eliminates a flat end and shoulders or breaks which can hang up on the grid strips or support features and cause rod buckling or grid damage.

In the case of detented caps such as shown in U.S. Pat. No. 5,024,807, the convex curve profile of the novel low pressure drop easy load fuel rod end caps will also minimize the chance of fuel rod buckling in bypassing the detent springs.

BRIEF DESCRIPTION OF THE DRAWINGS OF THE INVENTION

FIG. 1 is a fragmentary schematic plan view of a prior art pressurized water reactor fuel assembly support grid showing a control rod guide tube and representative fuel rods inserted into loaded cell positions. (See U.S. Pat. No. 4,295,935).

FIG. 2 is a fragmentary schematic plan view of a prior art pressurized water reactor fuel assembly lower end fitting. (See U.S. Pat. No. 5,024,807).

DETAILED DESCRIPTION OF THE ILLUSTRATED EMBODIMENT

Figure 1:
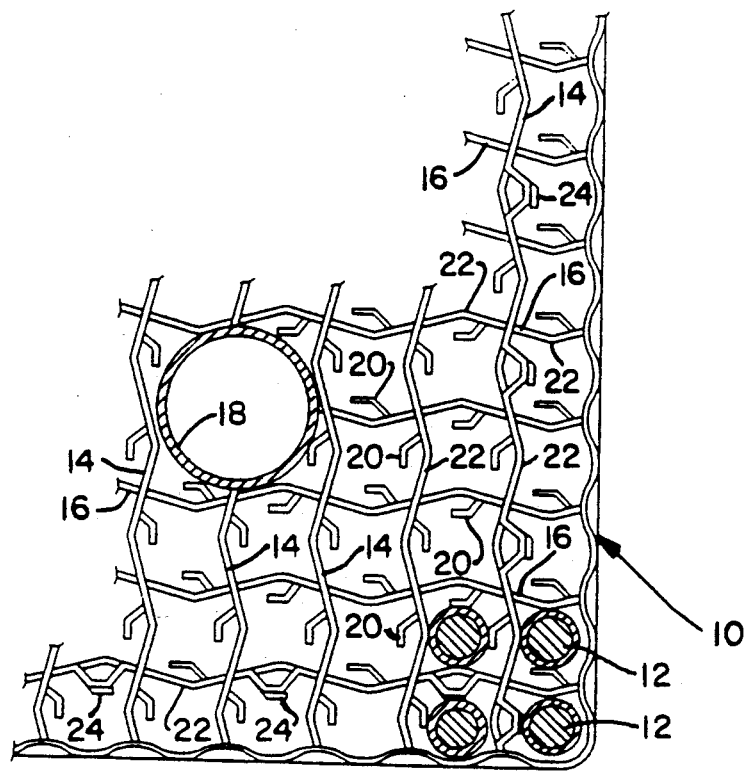

The numeral 10 generally designates a typical prior art pressurized water reactor fuel assembly support grid having fuel rods 12 mounted in cells thereof formed by "wavey", generally orthogonal, grid strips 14 and 16. The grid 10 is secured to the skeleton of the fuel assembly by means of guide tubes, such as the one in FIG. 1 labelled 18. Tang-like springs 20, bends 22 and arches 24 act as rod support features and are integral parts of the strips 14 and 16 of grid 10. To understand the insertion and centering operation of the fuel rods 12 with novel end caps, the location of the fuel rods 12 in the cells formed by strips 14 and 16, and their relation to the support features 20,22,24, should be noted.

Figure 2:
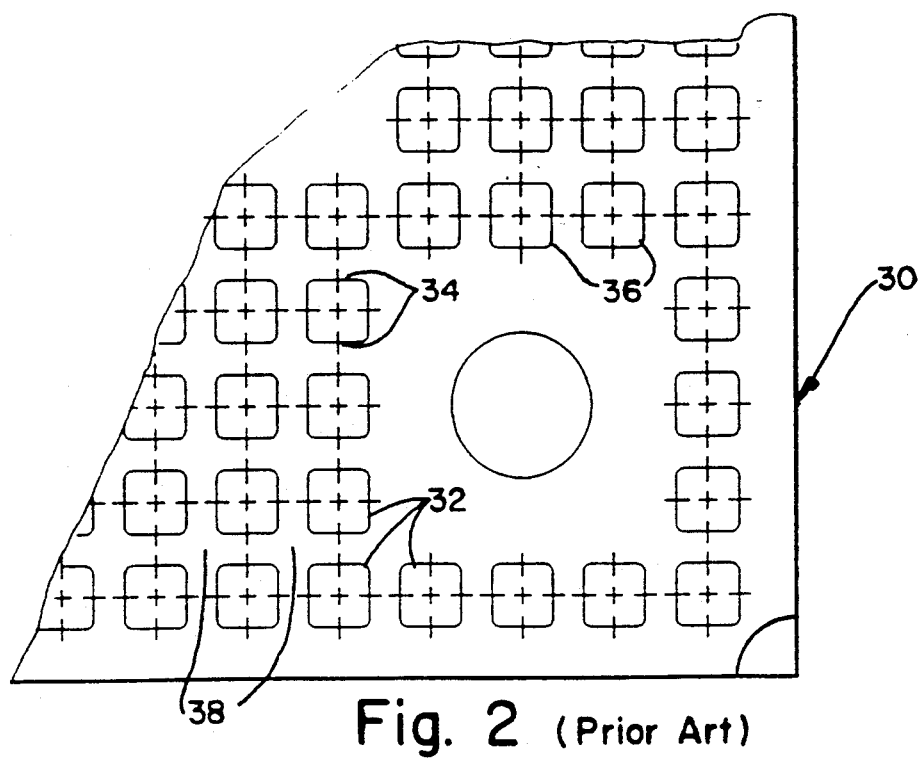

In FIG. 2, the numeral 30 generally designates a typical lower end fitting. It diffuses flow of reactor coolant by means of openings 32 defined by orthogonal ligaments 34 and 36. The inserted fuel assembly rods 12 are located at the intersections of the lower end fitting ligaments 34 and 36 in the "lands" 38, or just above (i.e., behind) the lands, in a completed fuel assembly. Thus, end caps of the rods 12 of the fuel assembly support grids 10 receive flow of coolant directly from the flow openings 32 of end fitting 30 during reactor operation.

Figure 3:
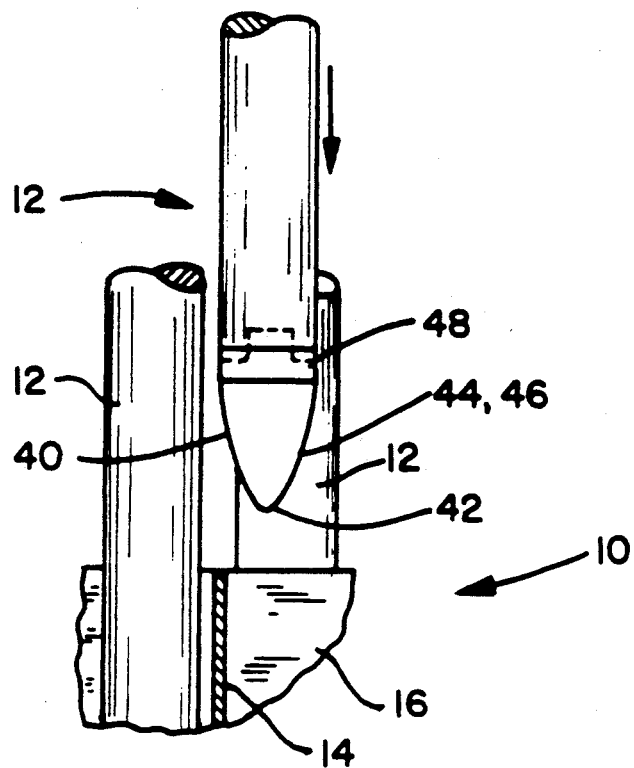
FIG. 3 is a schematic fragmentary side elevational view of a grid of a typical PWR nuclear fuel assembly with a fuel assembly rod which has a low pressure drop easy load rod end cap, and which is constructed according to the principles of the invention, being inserted and about to be centered in a cell by camming contact with a strip.

In order to load a PWR fuel assembly, the rods 12 of the fuel assembly must pass into the cells of grids 10 and proceed to their position above lands 32 of the lower end fitting 30. FIG. 3 shows a rod 12 being advanced in the direction shown by the arrow, toward a grid 10 with its solid Zircaloy low pressure drop easy load fuel assembly rod end cap 40, about to engage strip 14 of grid 10. When rod 12 proceeds farther down, the radiused tip 42 of end cap 40 will enter the cell defined by strips 14 and 16 and its convex cam shape will cam it into proper centered position over a land 32 of end fitting 30.

Figure 5:
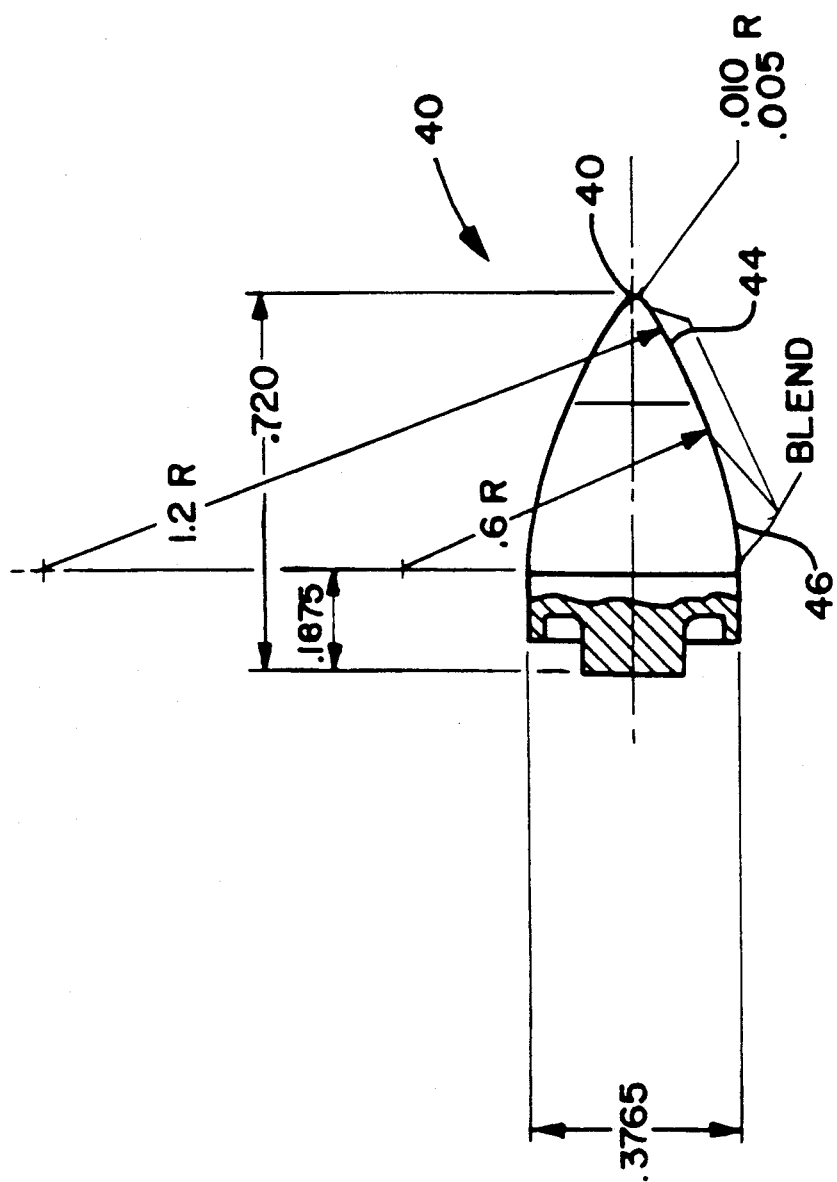
FIG. 5 is a detailed drawing of the low pressure drop easy load fuel assembly rod end cap of the invention with part broken away for clarity.

The convex cam shape of end cap 40 begins at tip 42 with a radius which typically may be from 0.005 to 0.010 inches and continues away from the tip in a smooth convex curve which has an initial portion 44 behind tip 42, typically created by a radius of 1.2 inches, which is blended into the tip 42 radius and on its opposite extreme is blended into a second portion 46 which typically has a radius of approximately one-half of the initial portion 34 (0.6 inches). The portion 46 blends into a cylindrical portion 48 to which the cladding tube 50 or other shank of the same diameter abuts. (See FIG. 5).

Figure 4:
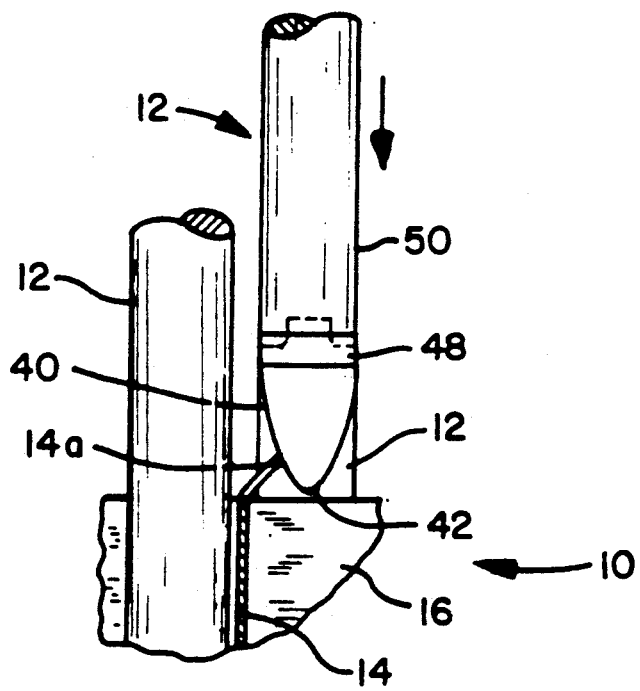
FIG. 4 is a view similar to FIG. 3 showing a fuel assembly rod which has a low pressure drop easy load rod end cap in camming contact with a mixing grid vane.

The smooth convex curve from tip 42, through portions 44, 46 and 48, thus create a camming surface which, in the example given, leads the approximately (0.3765 inches) diameter cladding tube past strips 14 and 16, the support features 20, 22 and 24, and any vanes 14a (FIG. 4) into the proper grid cell of grid 10 and the like grids (not shown) which make up a fuel assembly.

The radiused tip 42 and convex curved shape 44, 46, 48 provide a low pressure drop easy load fuel rod end cap without potential fuel rod buckling angular breaks in the end cap 40's profile and without a flat high pressure drop creating nose or tip which can also hang up on grids and vanes to damage grids or buckle rods.

I claim:

1. A low pressure drop easy load fuel assembly rod end cap for pressurized water reactor fuel assembly comprises:

a solid radiused tip with a longitudinal profile defined by a smooth convex curve blending to a substantially cylindrical surface portion of a diameter substantially equal to the diameter of the rod shank to which it is to be attached.

2. The end cap of claim 1 in which the tip radius is within the range of 0.010 to 0.005 inches.

3. The end cap of claim 1 in which all diameter changes are blended together without the creation in profile of an angled break.

4. The end cap of claim 1 in which the rod shank is a fuel cladding tube.

* * * * *